(12) United States Patent
    Sanden et al.

(10) Patent No.: US 11,237,183 B2
(45) Date of Patent: Feb. 1, 2022

(54) CERAMIC PROBE HEAD FOR AN AIR DATA PROBE WITH AND EMBEDDED HEATER

(71) Applicant: Rosemount Aerospace Inc., Burnsville, MN (US)

(72) Inventors: Christopher Sanden, Bloomington, MN (US); Scott D. Isebrand, Minneapolis, MN (US); Greg Allen Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 24 days.

(21) Appl. No.: 16/714,045

(22) Filed: Dec. 13, 2019

(65) Prior Publication Data

US 2021/0181229 A1    Jun. 17, 2021

(51) Int. Cl.
| | |
|---|---|
| *G01P 5/165* | (2006.01) |
| *B64D 15/12* | (2006.01) |
| *B64D 15/20* | (2006.01) |
| *G01P 13/02* | (2006.01) |
| *H05B 3/14* | (2006.01) |

(52) U.S. Cl.
CPC .............. *G01P 5/165* (2013.01); *B64D 15/12* (2013.01); *B64D 15/20* (2013.01); *G01P 13/025* (2013.01); *H05B 3/141* (2013.01); *H05B 2203/002* (2013.01)

(58) Field of Classification Search
None
See application file for complete search history.

(56) References Cited

U.S. PATENT DOCUMENTS

| | | | | |
|---|---|---|---|---|
| 2,984,107 | A | | 5/1961 | Strieby et al. |
| 4,357,526 | A | * | 11/1982 | Yamamoto ............. F23Q 7/001 123/145 A |
| 5,127,265 | A | * | 7/1992 | Williamson ............ B64F 1/005 150/154 |
| 5,628,565 | A | * | 5/1997 | Hagen .................... G01K 13/02 374/138 |
| 5,750,958 | A | * | 5/1998 | Okuda ..................... F23Q 7/001 123/145 A |
| 6,049,065 | A | * | 4/2000 | Konishi ................... F23Q 7/001 219/270 |
| 6,070,475 | A | * | 6/2000 | Muehlhauser ............ G01F 1/46 374/E13.006 |
| 6,236,027 | B1 | * | 5/2001 | Miyata .................... H05B 3/141 219/270 |

(Continued)

FOREIGN PATENT DOCUMENTS

| | | |
|---|---|---|
| EP | 3133403 A1 | 2/2017 |
| GB | 2561393 A | 10/2018 |

(Continued)

OTHER PUBLICATIONS

Extended European Search Report for European Patent Application No. 19215832.7, dated Aug. 10, 2020, 8 pages.

(Continued)

*Primary Examiner* — Harshad R Patel
(74) *Attorney, Agent, or Firm* — Kinney & Lange, P.A.

(57) ABSTRACT

A probe head for an air data probe includes a ceramic body and a heater embedded within the ceramic body.

20 Claims, 14 Drawing Sheets

(56) References Cited

U.S. PATENT DOCUMENTS

| | | | |
|---|---|---|---|
| 6,517,240 B1* | 2/2003 | Herb | G01K 11/24 |
| | | | 374/117 |
| 6,892,584 B2 | 5/2005 | Gilkison et al. | |
| 8,242,416 B2 | 8/2012 | Lin et al. | |
| 9,097,734 B2 | 8/2015 | Seaton et al. | |
| 9,207,253 B2 | 12/2015 | Seidel et al. | |
| 9,664,542 B2 | 5/2017 | Gordon et al. | |
| 9,719,820 B1 | 8/2017 | Jacob et al. | |
| 10,197,588 B2 | 2/2019 | Wong et al. | |
| 10,234,475 B2 | 3/2019 | Samo et al. | |
| 10,494,107 B2 | 12/2019 | Dardona et al. | |
| 10,578,498 B2 | 3/2020 | Parsons et al. | |
| 10,605,637 B2 | 3/2020 | Gordon et al. | |
| 10,884,014 B2 | 1/2021 | Golly et al. | |
| 10,955,433 B2 | 3/2021 | Jacob et al. | |
| 2007/0045477 A1 | 3/2007 | Armstrong et al. | |
| 2007/0108047 A1 | 5/2007 | Chang et al. | |
| 2010/0032292 A1 | 2/2010 | Wang et al. | |
| 2011/0240625 A1* | 10/2011 | Takenouchi | G01N 27/4067 |
| | | | 219/260 |
| 2012/0118076 A1 | 5/2012 | Foster | |
| 2013/0287378 A1* | 10/2013 | Kida | H05B 3/42 |
| | | | 392/465 |
| 2014/0042149 A1* | 2/2014 | Kamitani | H05B 3/48 |
| | | | 219/548 |
| 2014/0116154 A1* | 5/2014 | Seidel | G01F 1/46 |
| | | | 73/861.68 |
| 2014/0285943 A1* | 9/2014 | Watanabe | H01L 21/6833 |
| | | | 361/234 |
| 2016/0280391 A1* | 9/2016 | Golly | G01P 13/025 |
| 2016/0304210 A1 | 10/2016 | Wentland et al. | |
| 2017/0129616 A1* | 5/2017 | Coat-Lenzotti | B05D 1/28 |
| 2018/0079525 A1* | 3/2018 | Krueger | B64D 45/02 |
| 2018/0124874 A1 | 5/2018 | Dardona et al. | |
| 2018/0128849 A1* | 5/2018 | Wong | G01F 1/46 |
| 2018/0160482 A1* | 6/2018 | Hartzler | H05B 3/18 |
| 2018/0238723 A1 | 8/2018 | Seidel et al. | |
| 2018/0259547 A1 | 9/2018 | Abdullah et al. | |
| 2018/0281279 A1 | 10/2018 | Barocio et al. | |
| 2018/0372556 A1 | 12/2018 | Parsons et al. | |
| 2018/0372559 A1 | 12/2018 | Parsons et al. | |
| 2019/0001787 A1* | 1/2019 | Takeuchi | H05B 3/48 |
| 2019/0219611 A1* | 7/2019 | Lyding | G01Q 70/16 |
| 2019/0293676 A1 | 9/2019 | Jacob et al. | |
| 2020/0055582 A1 | 2/2020 | Botura et al. | |
| 2021/0055143 A1* | 2/2021 | Wigen | G01P 13/025 |

FOREIGN PATENT DOCUMENTS

| | | |
|---|---|---|
| KR | 20120069201 A | 6/2012 |
| KR | 101184780 B1 | 9/2012 |

OTHER PUBLICATIONS

Extended European Search Report for European Patent Application No. 20205705.5, dated Apr. 30, 2021, 10 pages.

* cited by examiner

CERAMIC PROBE HEAD FOR AN AIR DATA PROBE WITH AND EMBEDDED HEATER

BACKGROUND

The present disclosure relates generally to air data probes, and in particular, to probe heads.

Air data probes are mounted to an exterior of an aircraft in order to gain exposure to external airflow for measuring air data parameters. Thus, air data probes are exposed to the environmental conditions exterior to the aircraft, which are often cold. As such, heaters are positioned within air data probes to ensure the air data probes function properly in liquid water, ice crystal, and mixed phase icing conditions. It can be difficult to successfully arrange the heater within the probe head of an air data probe.

SUMMARY

A probe head for an air data probe includes a ceramic body and a heater embedded within the ceramic body.

An air data probe includes a strut, a probe head connected to the strut, and a transition piece having a first end connected to the probe head and a second end connected to the strut such that the transition piece connects the probe head to the strut. The probe head includes a ceramic body and a heater embedded within the ceramic body.

DETAILED DESCRIPTION

In general, the present disclosure describes an air data probe that has a probe head made up of ceramic layers and heater layers that undergo a high temperature co-fired ceramic process such that the probe head is ceramic with embedded heaters. The probe head is attached to a strut via a transition piece that acts as the high stress area of the air data probe and includes water trap features to prevent ice and water accumulation within the probe. As a result, heaters are integrated into the probe head for more efficient and tailored, or customized, heat distribution to reduce required power and heater failure and increase heater reliability, strength, and response time.

Figure 1:
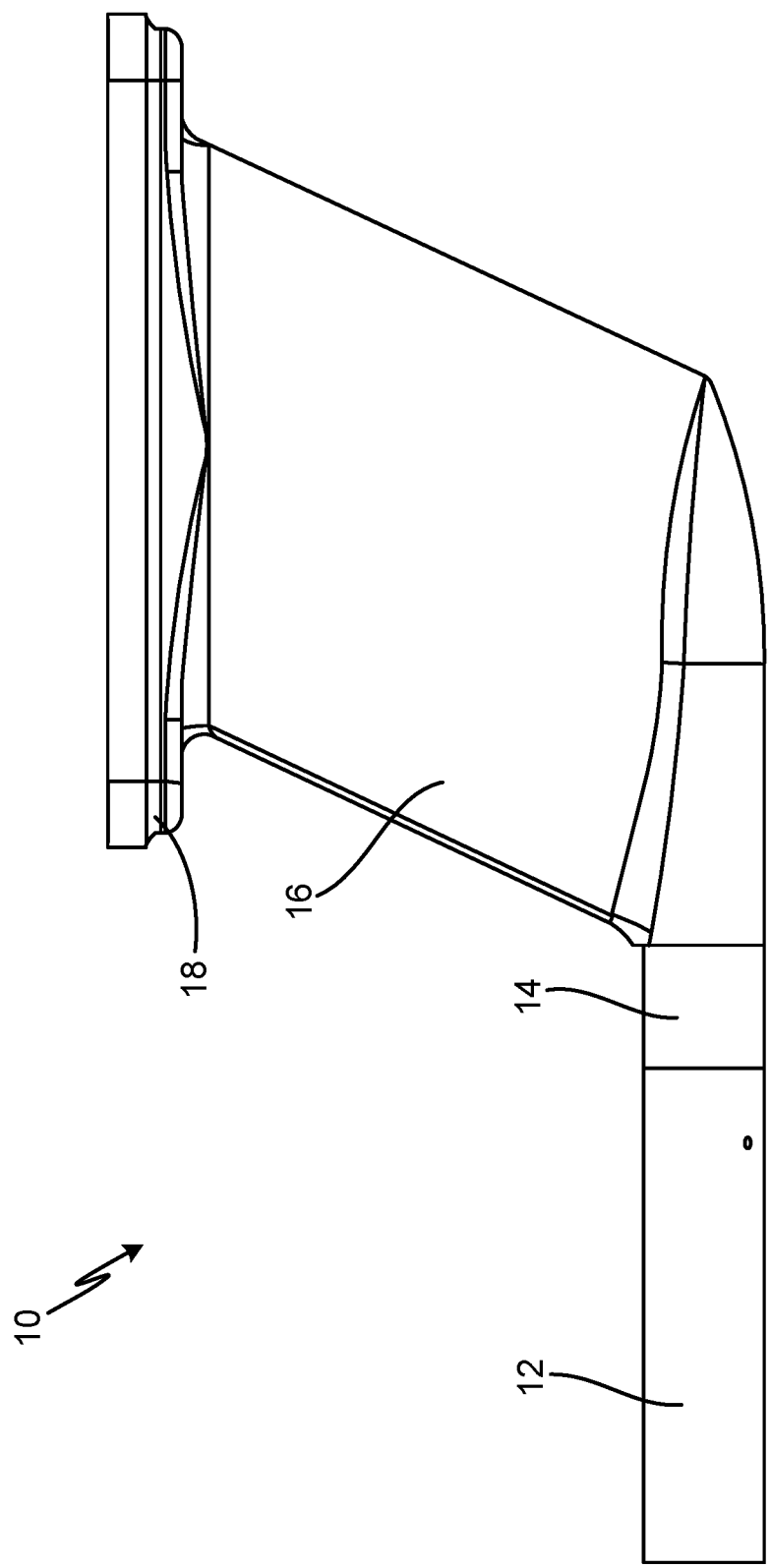
FIG. 1 is a side view of an air data probe.

FIG. 1 is a side view of air data probe 10. Air data probe 10 includes probe head 12, transition piece 14, strut 16, and mounting flange 18.

Air data probe 10 may be a pitot probe, a pitot-static probe, or any other suitable air data probe. Probe head 12 is the sensing head of air data probe 10. Probe head 12 is a forward portion of air data probe 10. Probe head 12 has an opening at a first end of probe head 12. Probe head 12 is connected to a first end of transition piece 14 near a second end of probe head 12. A second end of transition piece 14 is connected to a first end of strut 16. As such, probe head 12 is connected to strut 16 via transition piece 14. Strut 16 is blade-shaped. Internal components of air data probe 10 are located within strut 16. Strut 16 is adjacent mounting flange 18. A second end of strut 16 is connected to mounting flange 18. Mounting flange 18 makes up a mount of air data probe 10. Mounting flange 18 is connectable to an aircraft.

Air data probe 10 is configured to be installed on an aircraft. Air data probe 10 may be mounted to a fuselage of the aircraft via mounting flange 18 and fasteners, such as screws or bolts. Strut 16 holds probe head 12 away from the fuselage of the aircraft to expose probe head 12 to external airflow. Transition piece 14 connects probe head 12 to strut 16. Probe head 12 takes in air from surrounding external airflow and communicates air pressures pneumatically through internal components and passages of probe head 14 and strut 16 through a pressure fitting (not shown). Pressure measurements are communicated to a flight computer and can be used to generate air data parameters related to the aircraft flight condition.

Figure 2:
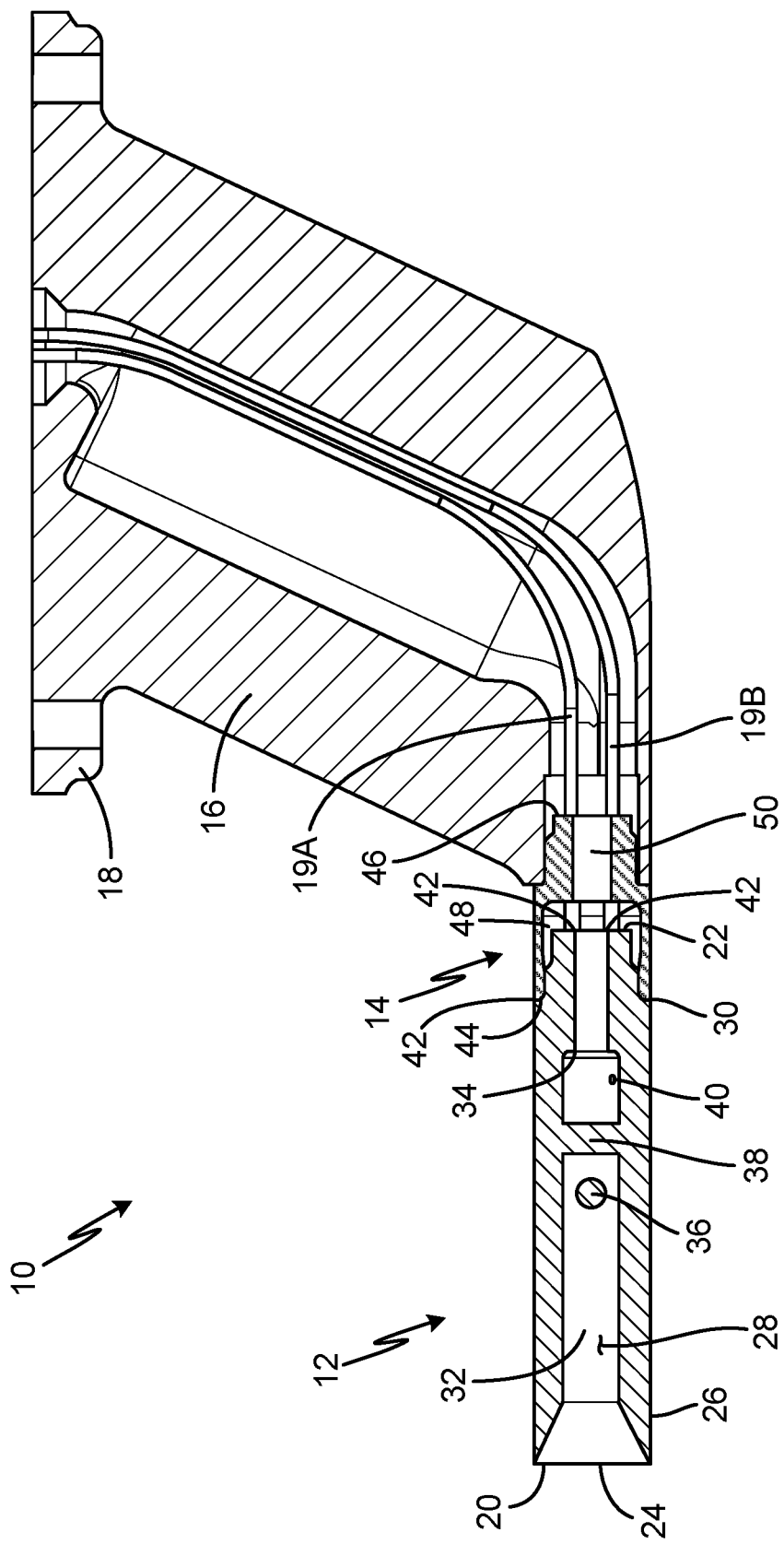
FIG. 2 is a cross-sectional side view of the air data probe.
Figure 3:
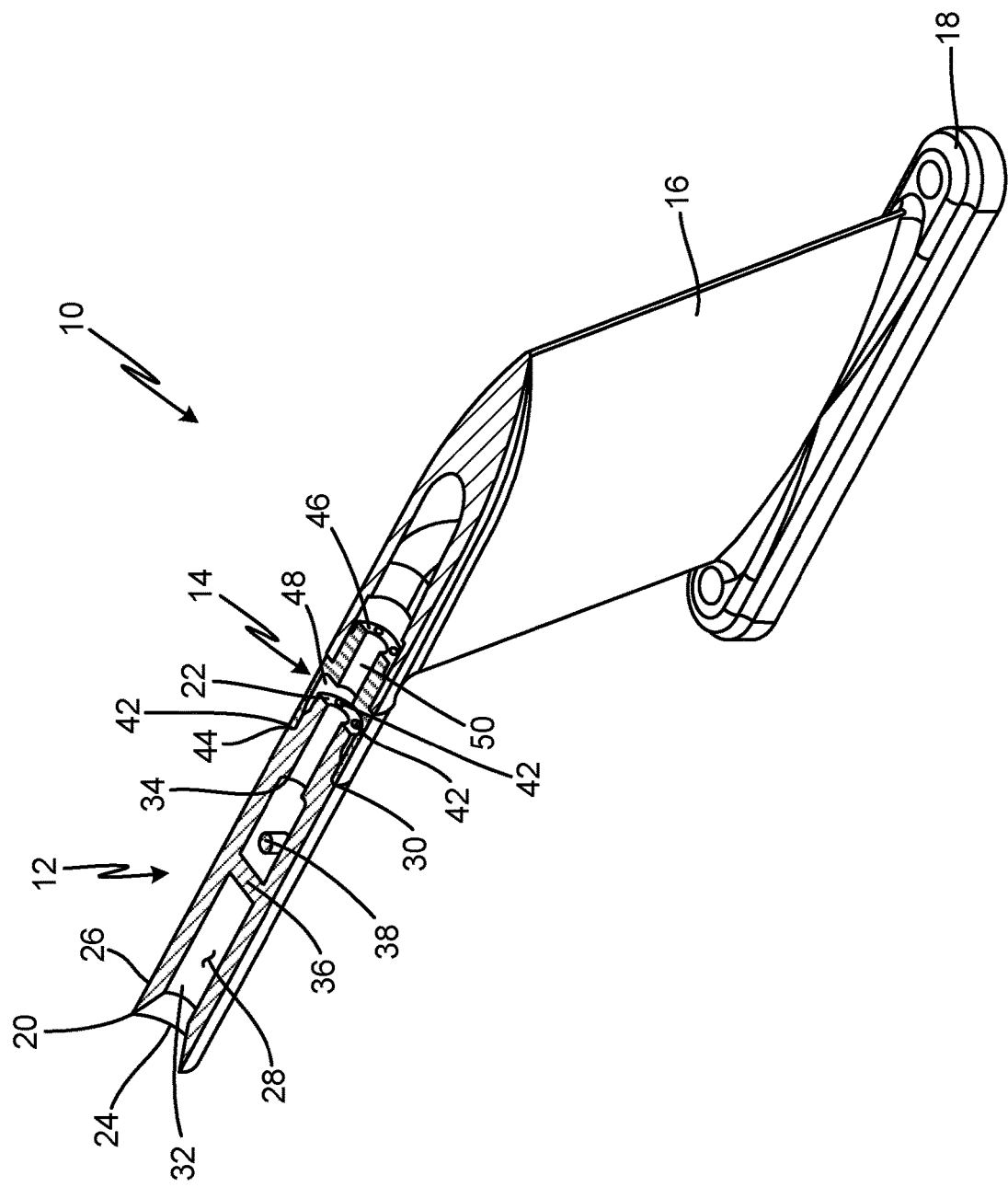
FIG. 3 is a cross-sectional isometric view of the air data probe.
Figure 4:
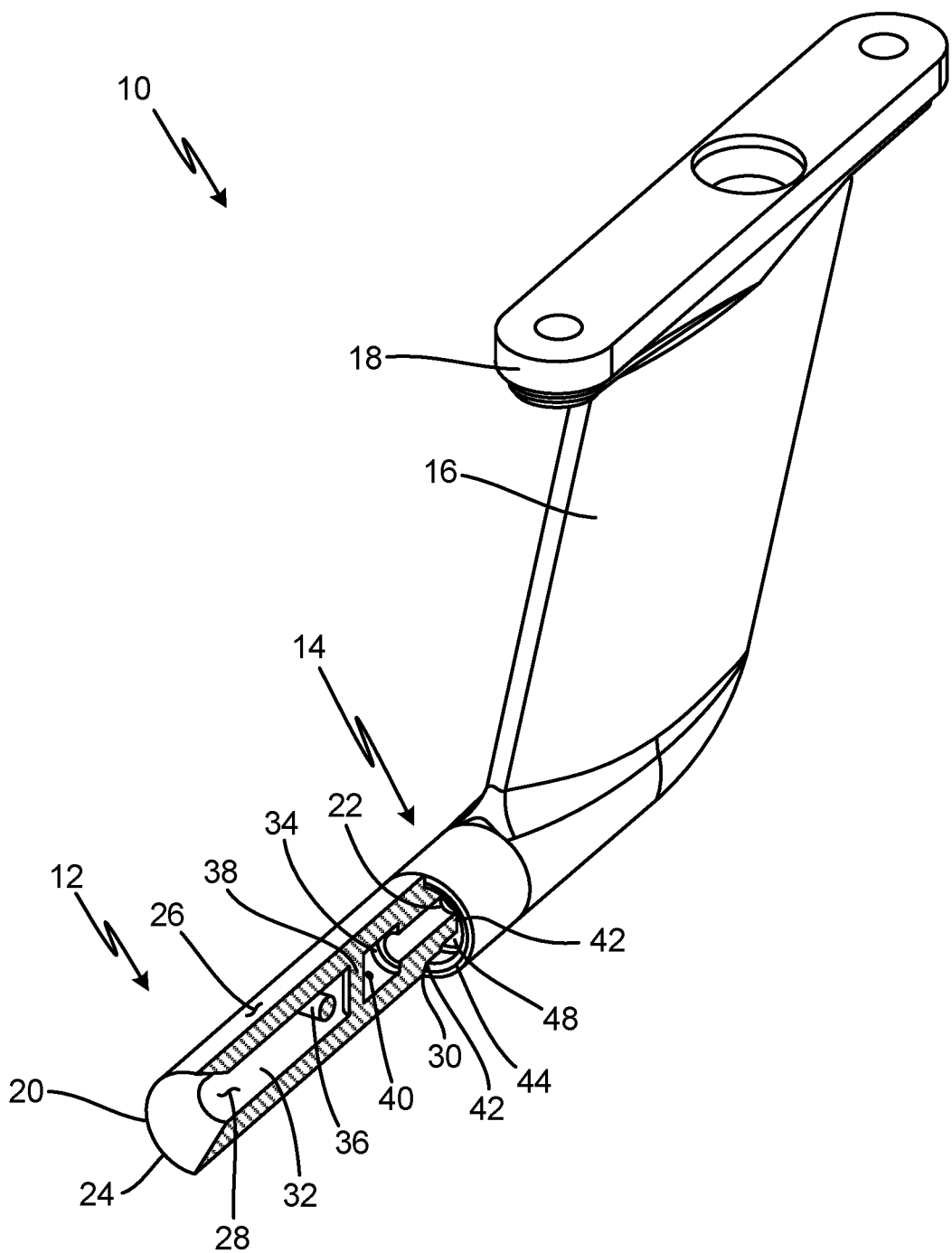
FIG. 4 is an isometric view of the air data probe showing a probe head in cross-section.
Figure 5:
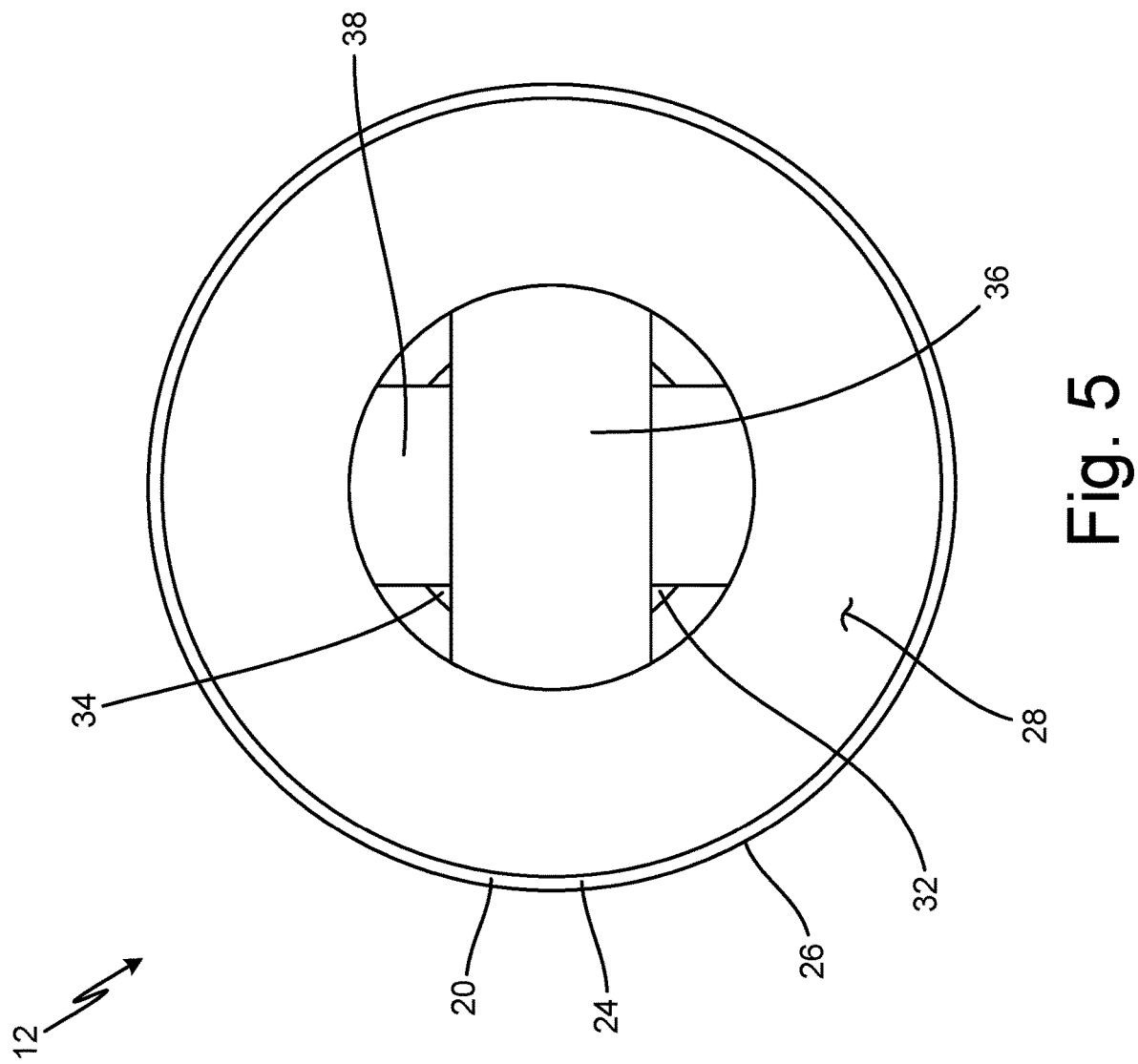
FIG. 5 is an end view of the probe head from a first end of the probe head.
Figure 6:
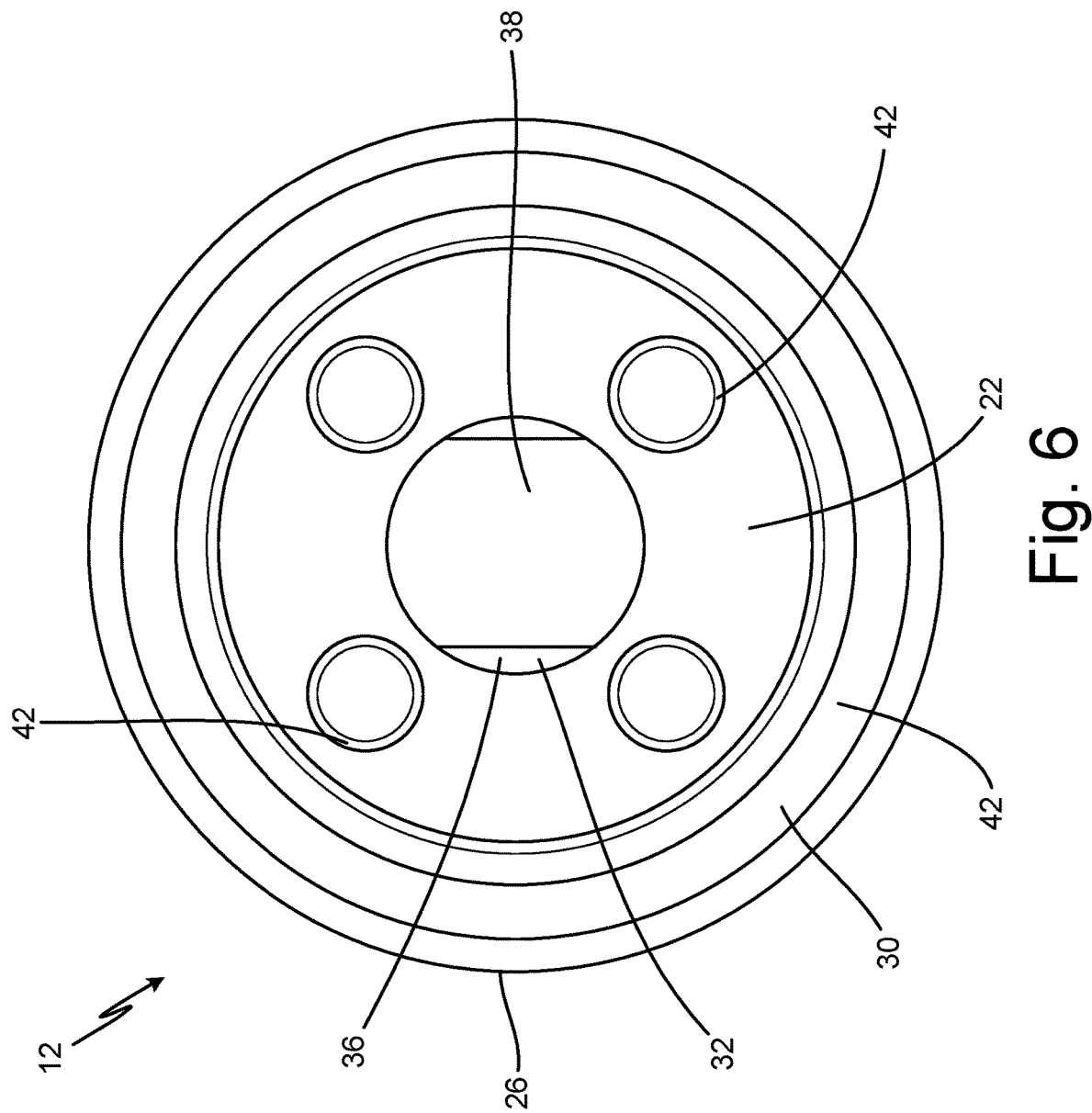
FIG. 6 is an end view of the probe head from a second end of the probe head.

FIG. 2 is a cross-sectional side view of air data probe 10. FIG. 3 is a cross-sectional isometric view of air data probe 10. FIG. 4 is an isometric view of air data probe 10 showing probe head 12 in cross-section. FIG. 5 is an end view of probe head 12 from first end 20 of probe head 12. FIG. 6 is an end view of probe head 12 from second end 22 of probe head 12. FIGS. 2-6 will be discussed together. Air data probe 10 includes probe head 12, transition piece 14, strut 16, mounting flange 18, and electrical wires 19A and 19B. Probe head 12 includes first end 20, second end 22, tip 24, exterior surface 26, interior surface 28, shoulder 30, passageway 32, lip 34, first post 36, second post 38, drain holes 40, and metalized surfaces 42. Transition piece 14 includes first end 44, second end 46, socket 48, and passageway 50.

Air data probe 10 has probe head 12 connected to transition piece 14. Transition piece 14 is also connected to strut 16. As such, transition piece 14 is between probe head 12 and strut 16 and connects probe head 12 to strut 16. Strut is connected to mounting flange 18, which connects to an aircraft. Electrical wires 19A and 19B connect to probe head 12 and extend through transition piece 14, strut 16, and mounting flange 18 to an interior of the aircraft.

Probe head 12 has a ceramic body and is heated. Probe head 12 is rod-like and has first end 20 at an upstream end of probe head 12 and second end 22 at a downstream end of probe head 12, which is opposite first end 20. Tip 24 is at first end 20 of probe head 12. Tip 24 defines an opening at first end 20 of probe head 12. Exterior surface 26 is an outer surface of probe head 12 that extends from first end 20 to second end 22. Interior surface 28 is an inner surface of probe head 12 that extends from first end 20 to second end 22. Exterior surface 26 forms shoulder 30 near second end 22. An outer diameter of probe head 12 from shoulder 30 to second end 22 is less than an outer diameter of probe head 12 from shoulder 30 to first end 20. The outer diameter of probe head 12 from shoulder 30 to first end 20 is about constant. The outer diameter of probe head 12 from shoulder 30 to second end 22 may decrease or vary.

Interior surface 28 forms passageway 32, which extends from first end 20 to second end 22. As such, passageway 32 extends an entire length of probe head 12. Passageway 32 begins at the opening defined by tip 24 at first end 20. Interior surface 28 also forms lip 34. Passageway 32 has a smaller cross-sectional area at lip 34. First post 36 is a rod having a first end connected to interior surface 28 and a second end connected to interior surface 28 such that first post 36 extends through a center of passageway 32. Second post 38 is a rod having a first end connected to interior surface 28 and a second end connected to interior surface 28 such that second post 38 extends through a center of passageway 32 perpendicular to first post 36. First post 36 is upstream of second post 38. In this embodiment, probe head 12 has two posts, first post 36 and second post 38. In alternate embodiments, probe head 12 may have one post, three posts, or any suitable number of posts. Drain holes 40 are holes that extend from interior surface 28 to exterior surface 26 downstream of first post 36 and second post 38 and upstream of lip 34. In this embodiment, air data probe 10 includes two drain holes 40. In alternate embodiments, air data probe 10 may include any number of drain holes 40. Lip 34, first post 36, second post 38, and drain holes 40 act as a water management feature of probe head 12. A metalized surface 42 is at second end 22 of probe head 12. Metalized surface 42 at second end 22 connects to electrical wires 19A and 19B. A metalized surface 42 is also at shoulder 30 of probe head 42.

Transition piece 14 is made of a ductile material, such as nickel. Transition piece 14 has first end 44 at an upstream end of transition piece 14 and second end 46 at a downstream end of transition piece 14. First end 44 of transition piece 14 is connected to probe head 12 at shoulder 30 via metalized surface 42 of shoulder 30. Second end 46 of transition piece 14 is connected to strut 16. Socket 48 is an opening that extends into transition piece 14 from first end 44. Second end 22 of probe head 12 extends within socket 48 of transition piece 14. Electrical wires 19A and 19B connect to metalized surface 42 at second end 22 of probe head 12 within socket 48 of transition piece 14. Passageway 50 of transition piece 14 extends from socket 48 to second end 46 of transition piece 14. As such, passageway 32 of probe head 12, socket 48 of transition piece 14, and passageway 50 of transition piece 14 are connected, or are in fluid communication.

Transition piece 14 connects ceramic probe head 12 to metal strut 16. Transition piece 14 is the high stress area of air data probe 10. Electrical wires 19A and 19B connected to metalized surface 42 at second end 22 of probe head 12 provides electrical connection from within an aircraft to probe head 12 for supplying heat to heaters within probe head 12. As such, metalized surfaces 42 allow for electrical and mechanical connections of probe head 12.

As external airflow enters probe head 12 at first end 20 and flows through passageway 32, water and ice particles in the airflow hit and are knocked down by first post 36, second post 38, and lip 34. Because probe head 12 is heated, first post 36 and second post 38 are heated, and knocked down ice particles melt within passageway 32. Lip 34 prevents the water from moving further downstream within probe head 12. Water then drains out of passageway 32 via drain holes 40 to exit probe head 12. Therefore, first post 36, second post 38, and lip 34 prevent ingested airflow and contaminants within the airflow from having a straight path through probe head 12.

Transition piece 14 allows ceramic probe head 12 to connect to metal strut 16.

Transition piece 14 is made of nickel and accounts for different thermal expansion between the ceramic body of probe head 12 and metal strut 16. Transition piece 14 prevents probe head 12 from detaching from strut 16, and potentially moving backward into the engine and causing damage. Because transition piece 14 is the high stress area, or weak point, of air data probe 10 and is made of a ductile material, transition piece 14 also absorbs impacts, such as from bird strikes or hail, and prevents the more brittle ceramic probe head 12 from fracturing and separating from air data probe 10. First post 36, second post 38, and lip 34 prevent water from moving through air data probe 10 and affecting the accuracy of pressure measurements.

Figure 7:
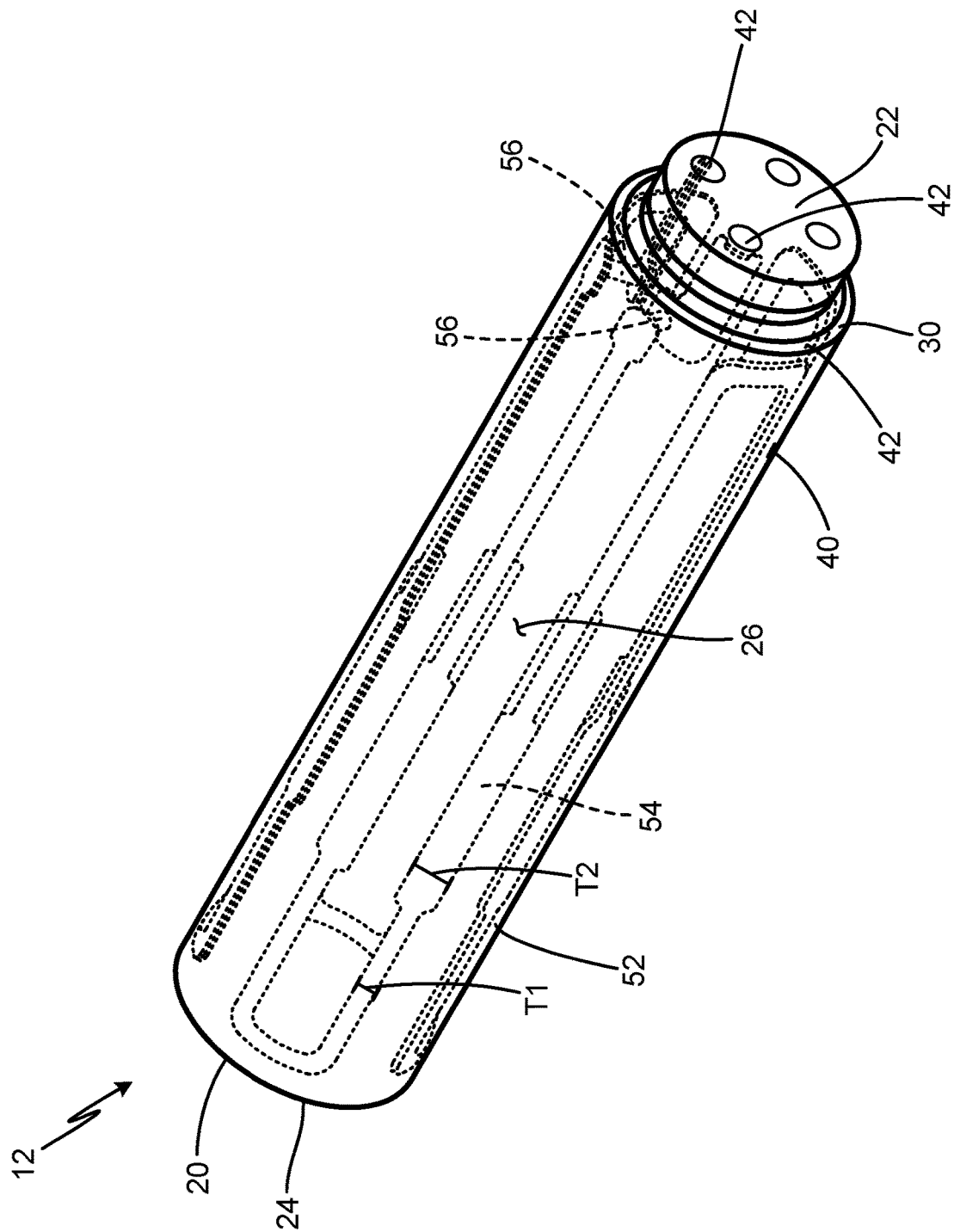
FIG. 7 is an isometric view of the probe head showing an embedded heater.

FIG. 7 is an isometric view of probe head 12 showing embedded heater 54. Probe head 12 includes first end 20, second end 22, tip 24, exterior surface 26, shoulder 30, drain hole 40, metalized surfaces 42, ceramic body 52, heater 54, and vias 56.

Probe head 12 has the same structure and function as probe head 12 described with respect to FIGS. 1-6. Probe head 12 has ceramic body 52, which makes up first end 20, second end 22, tip 24, exterior surface 26, interior surface 28 (shown in FIGS. 2-5), shoulder 30, passageway (shown in FIGS. 2-6), lip 34 (shown in FIGS. 2-5), and drain hole 40. First post 36 and second post 38 (shown in FIGS. 2-6) are connected to ceramic body 52. Ceramic body 52 is made of aluminum nitride. In alternate embodiments, ceramic body 52 may be silicon nitride, alumina, or any other suitable ceramic. Heater 54 is embedded within ceramic body 52. Heater 54 extends along ceramic body 52 of probe head 12 from adjacent first end 20 to second end 22. In alternate embodiments, heater 54 may have any suitable pattern based on the heating needs of probe head 12. Heater 54 varies in thickness. For example, heater 54 has thickness T1 and has thickness T2, which is thickener than T1. In alternate embodiments, heater 54 may have no variation in thickness. Heater 54 is tungsten composite metal. In alternate embodiments, heater 54 may be platinum, molymaganese, or any other suitable metallized material. Heater 54 may also comprise multiple layers, as shown in FIG. 7, which are connected by vias 56. Heater 54 is connected to metalized surface 42 at second end 22 of probe head 12.

Heater 54 is embedded within ceramic body 52 of probe head 12 via a high temperature co-fired ceramic process, where heater 54 (the conductor) and ceramic body 52 (the insulator) are fired at the same time to result in a fully dense material. More specifically, traces of heater 54 are applied to ceramic body 52 as an unrolled tape, which is wound around a mandrel, and heater 54 and ceramic body 52 are fired to turn from pliable separate materials to a hard solid material. As such, probe head 12 has about zero porosity. First post 36 and second post 38, which are made of the same material as ceramic body 52, may then be connected to ceramic body 52, such as via brazing or gluing (for example, with a ceramic glue or any other suitable material). Metalized surfaces 42 are applied to bores that receive electrical wires 19A and 19B at second end 22 of ceramic body 52 and to shoulder 30 of ceramic body 52. Electrical wires 19A and 19B are soldered to metalized surface 42 at second end 22 to achieve a hermetically sealed electrical connection. A metalized surface 42 is applied to shoulder 30 prior to brazing probe head 12 to first end 44 of transition piece 14, such that ceramic probe head 12 can connect to transition piece 14 via metalized surface 42 of shoulder 30.

Air data probe 10 is installed on an aircraft and subjected to icing conditions during flight. Ceramic body 52 of probe head 12 acts as both the substrate of heater 54 and the structure of probe head 12. Heater 54 is encapsulated in ceramic body 52. Heater 54 provides heat to air data probe 10 to prevent and remove ice growth. Different regions of air data probe 10 may require different levels of heat. As such, heater 54 varies in thickness, which varies resistance, and may have multiple layers, such that more or less heat can be distributed based on the heating needs of probe head 12. Heater 54 receives power via metalized surface 42 at second end 22. Vias 56 act as electrical connectors between different layers of heater 54 to distribute power. Ceramic body 52 allows for high Watt densities and can change temperature rapidly.

Traditionally, heaters are brazed into air data probes. As such, manufacturing limitations affect where and how heaters can be placed on the air data probe. For example, arranging heaters near the tip of the probe head can be difficult, which makes heating the tip difficult. Brazed heaters also fail due to corrosion, thermal fatigue, and oxidation.

Probe head 12 formed by a high temperature co-fired ceramic process allows for more flexibility with respect to where heater 54 is positioned within probe head 12 and how much heat is applied in particular areas of probe head 12. Heater 52 can be varied based on heating needs of probe head 12. Because a high temperature co-fired ceramic process is used to form probe head 12, heater 52 can be positioned in locations that are traditionally difficult to place heaters. For example, a portion of heater 54 can be placed closer to tip 24 than is possible with brazing. Tip 24 is an area of probe head 12 that is prone to accreting ice and is traditionally difficult to heat. Aluminum nitride ceramic body 52 also has a high thermal conductivity and heats or cools quickly for increased efficiency and a fast response time. Heater 52 can be pulsed to save power in certain conditions. Heater 52 is tailored to provide heat only where heat is needed, decreasing power needs of probe head 12, reducing overheat events, and resulting in more effective and cost-efficient heating of probe head 12.

Because probe head 12 has about zero porosity, there is no joint between ceramic body 52 and heater 54. As a result, heater 54 is better protected, reducing corrosion and oxidation. Additionally, stresses between the insulator, or substrate, and the conductor during thermal cycling are low such that probe head 12 is stronger and has increased reliability. Exterior surface 26 and interior surface 28 are also better protected. Ceramic body 52 is a hard substrate, which reduces erosion effects on lead edges.

Figure 8:
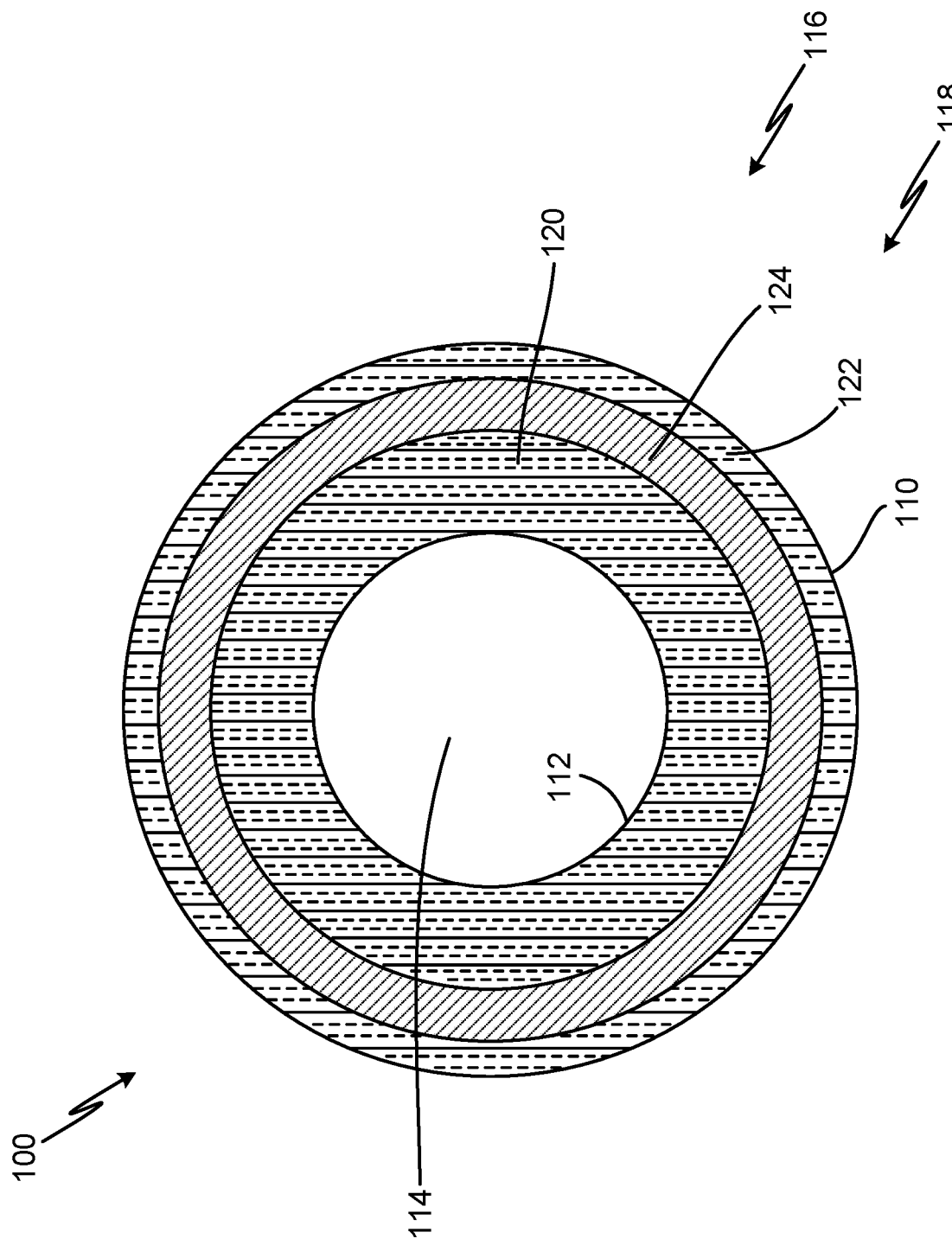
FIG. 8 is a cross-sectional view of a second embodiment of the probe head.

FIG. 8 is a cross-sectional view of probe head 100. Probe head 100 includes exterior surface 110, interior surface 112, passageway 114, ceramic body 116, and heater 118. Ceramic body 116 includes ceramic layer 120 and ceramic layer 122. Heater 118 includes heater layer 124.

Probe head 100 has the same structure and function as probe head 10 described with respect to FIGS. 1-7. Probe head 100 has an exterior surface 110 at an outer surface of probe head 100 and interior surface 112 at an inner surface of probe head 100. Interior surface 112 forms passageway 114 at a center of probe head 100. Exterior surface 110, interior surface 112, and passageway 114 are all formed by ceramic body 116.

In this embodiment, probe head 100 has heater 118 embedded within ceramic body 116. Ceramic body 116 and heater 118 have a similar structure and function as ceramic body 52 and heater 54, respectively, described with respect to FIG. 7; however, ceramic body 116 has ceramic layers 120 and 112, and heater 118 has heater layer 124. Ceramic layer 120 forms interior surface 112 and defines passageway 114. Heater layer 124 is between ceramic layer 120 and ceramic layer 122. Ceramic layer 122 forms exterior surface 110. In alternate embodiments, probe head 100 may comprise a stack up of any number of alternating ceramic layers and heater layers. Further, the stack up of ceramic layers 120 and 122 and heater layer 124 may vary along probe head 100.

Ceramic layers 120 and 122 and heater layer 124 undergo a high temperature co-fired ceramic process to form probe head 100. Ceramic layers 120 and 122 of ceramic body 116 form the structure of probe head 12 and provide insulation for heater layer 124 of heater 118. Variation of location within probe head 100 and thickness of heater layer 124 allow for tailored heat distribution along probe head 100.

Figure 9A:
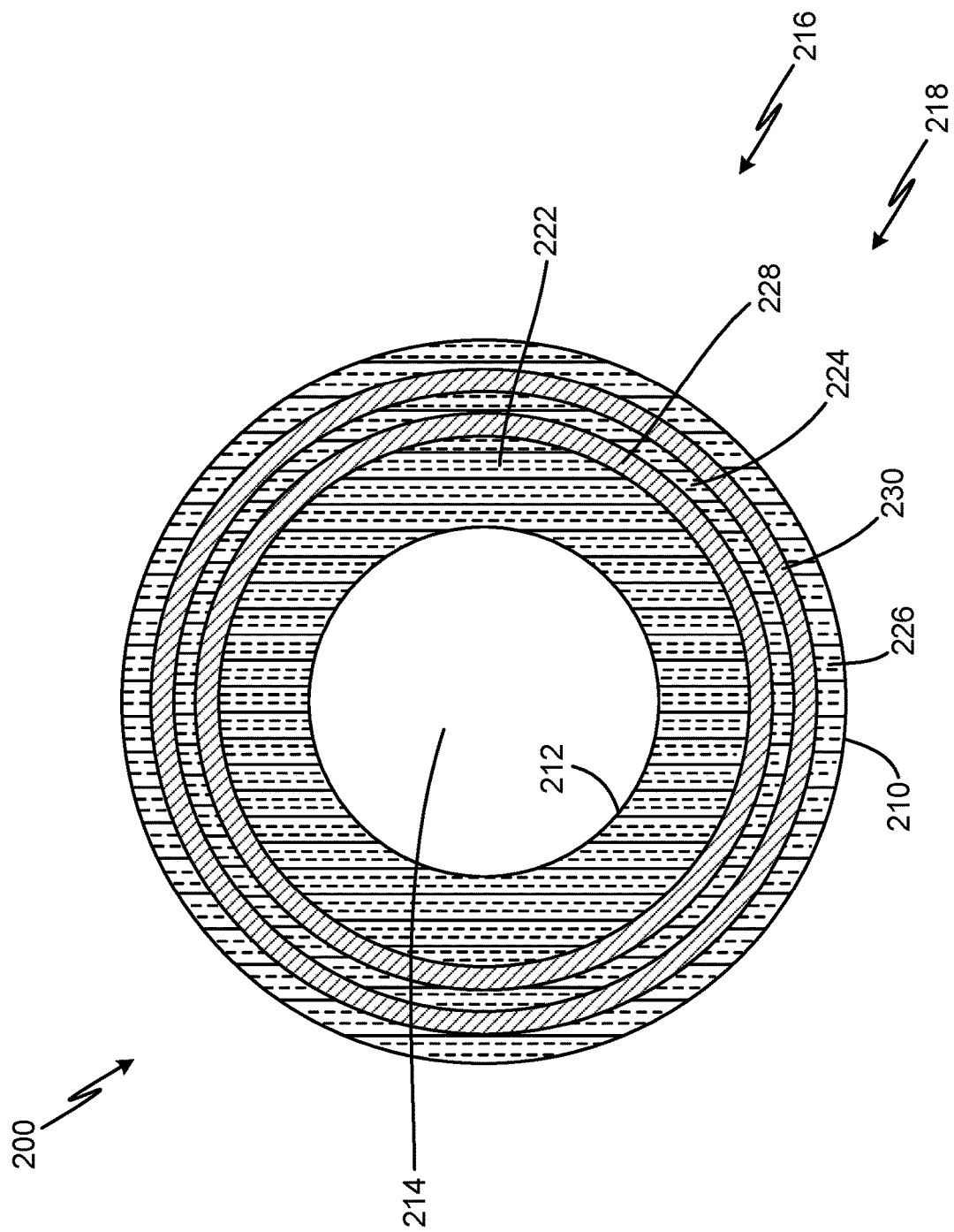
FIG. 9A is a cross-sectional view of a third embodiment of the probe head.
Figure 9B:
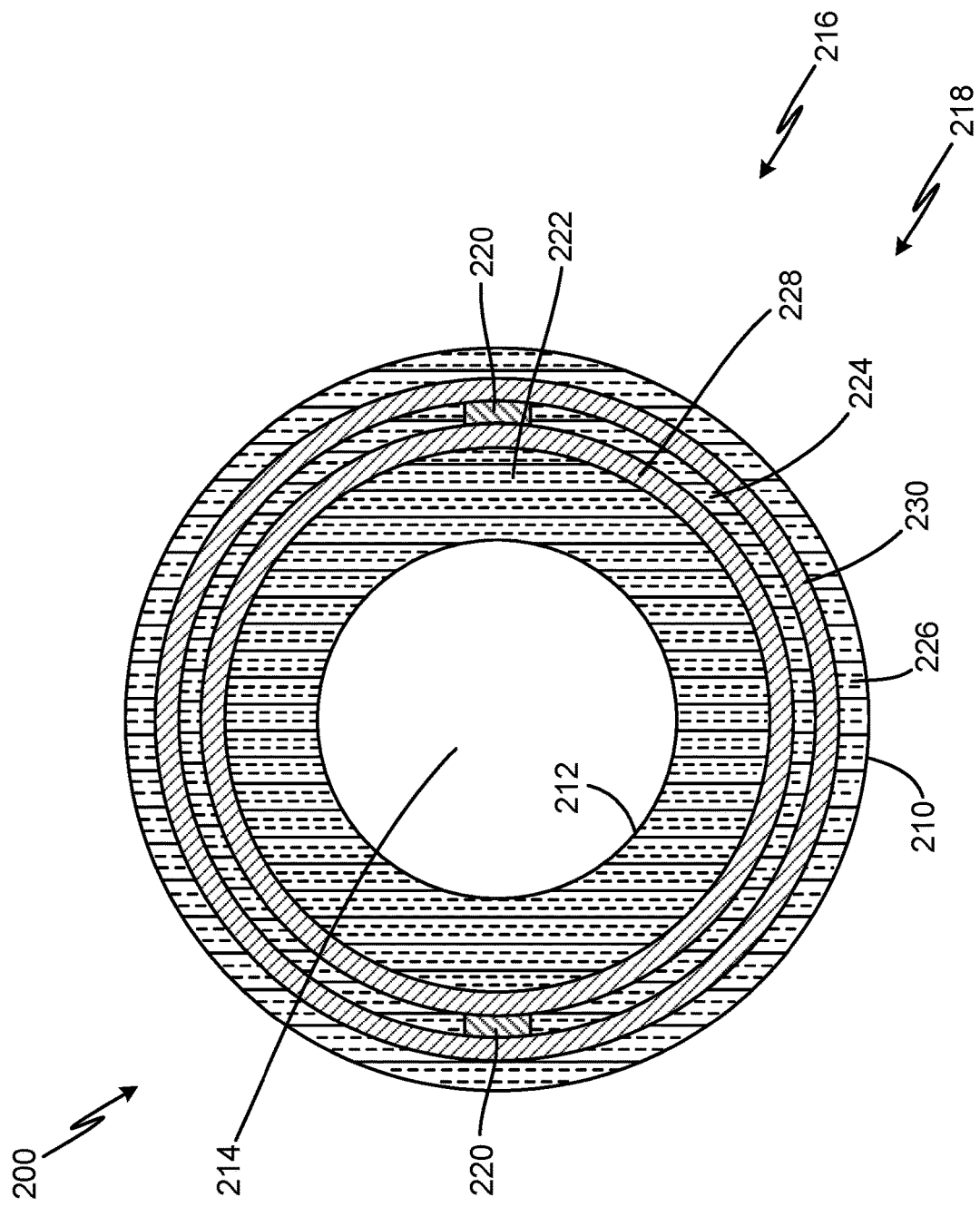
FIG. 9B is a cross-sectional view of the third embodiment of the probe head showing vias.

FIG. 9A is a cross-sectional view of probe head 200. FIG. 9B is a cross-sectional view of probe head 200 showing vias 220. FIGS. 9A and 9B will be discussed together. Probe head 200 includes exterior surface 210, interior surface 212, passageway 214, ceramic body 216, heater 218, and vias 220 (shown in FIG. 9B). Ceramic body 216 includes ceramic layer 222, ceramic layer 224, and ceramic layer 226. Heater 218 includes heater layer 228 and heater layer 230.

Probe head 200 has the same structure and function as probe head 10 described with respect to FIGS. 1-7. Probe head 200 has an exterior surface 210 at an outer surface of probe head 200 and interior surface 212 at an inner surface of probe head 200. Interior surface 212 forms passageway 214 at a center of probe head 200. Exterior surface 210, interior surface 212, and passageway 214 are all formed by ceramic body 216.

In this embodiment, probe head 200 has heater 218 embedded within ceramic body 216. Ceramic body 216 and heater 218 have a similar structure and function as ceramic body 52 and heater 54, respectively, described with respect to FIG. 7; however, probe head 200 may include vias 220, ceramic body 216 has ceramic layers 222, 224, and 226, and heater 218 has heater layers 228 and 230. Ceramic layer 222 forms interior surface 212 and defines passageway 214. Heater layer 228 is between ceramic layer 222 and ceramic layer 224. Heater layer 230 is between ceramic layer 224 and ceramic layer 226. Ceramic layer 226 forms exterior surface 210. In alternate embodiments, probe head 200 may comprise a stack up of any number of alternating ceramic layers and heater layers. Further, the stack up of ceramic layers 222, 224, and 226 and heater layers 228 and 230 may vary along probe head 200.

In FIG. 9A, probe head 200 does not include vias 220. FIG. 9B shows vias 220 as part of probe head 200. In the embodiment of FIG. 9B, probe head 200 has two vias 220. In alternate embodiments, probe head 200 may have any number of vias 220. Vias 220 are positioned within ceramic layer 224 such that a first end of each via 220 contacts heater layer 228 and a second end of each via 220 contacts heater layer 230.

Ceramic layers 222, 224, and 226 and heater layers 228 and 230 undergo a high temperature co-fired ceramic process to form probe head 200. Ceramic layers 222, 224, and 226 of ceramic body 216 form the structure of probe head 200. Ceramic layers 222 and 224 provide insulation for heater layer 228 of heater 218, and ceramic layers 224 and 226 provide insulation for heater layer 230 of heater 218. Variation of location within probe head 200 and thickness of heater layers 228 and 230 allow for tailored heat distribution along probe head 200. Having multiple heater layers 228 and 230 allows for increased Watt density and enables further tailoring of heat distribution. Increased Watt density results in increased heat in regions of probe head 200 more likely to accrete ice, such as tip 24. As shown in FIG. 9B, probe head 200 may include vias 220 to connect heater layers 228 and 230.

Figure 10:
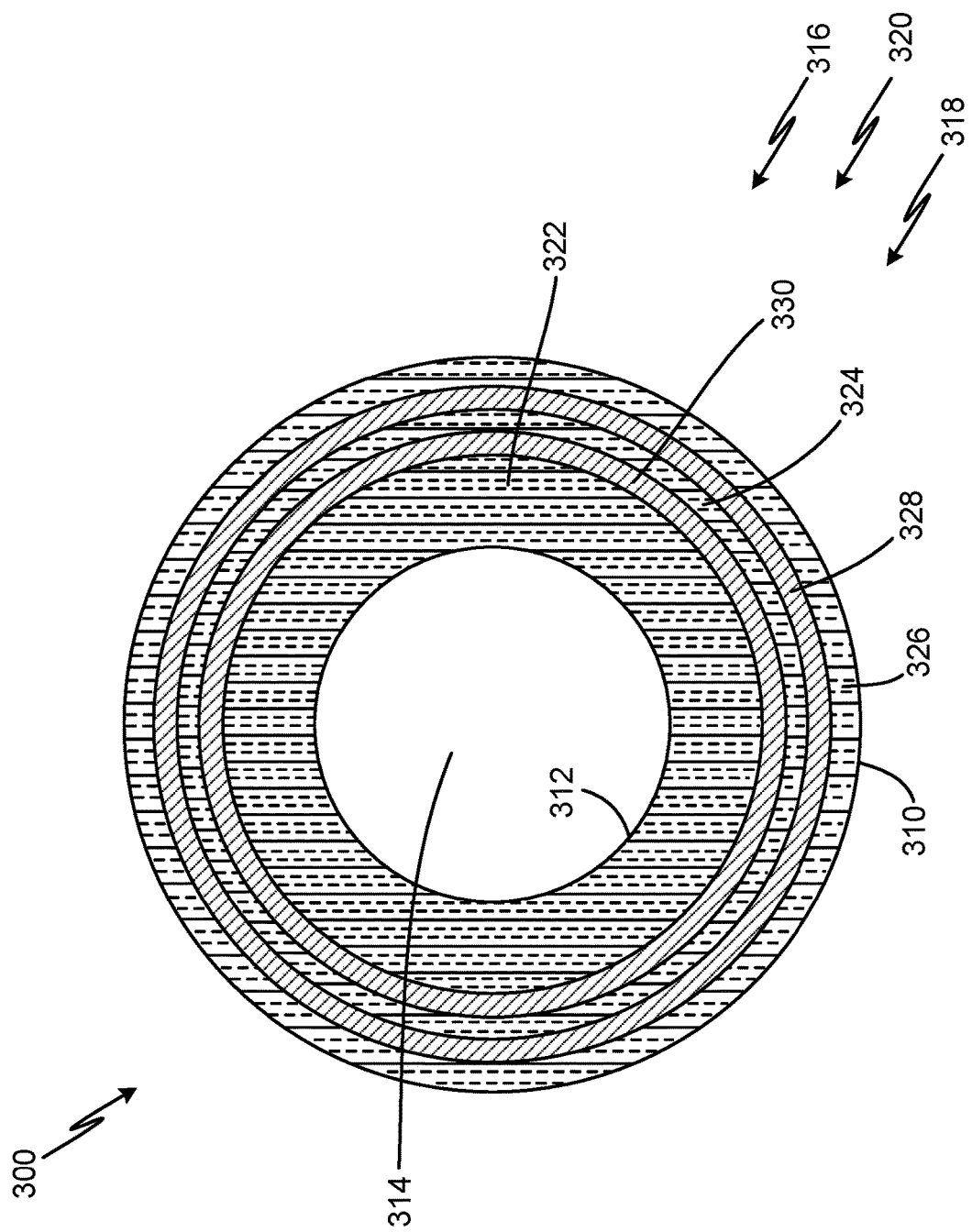
FIG. 10 is a cross-sectional view of a fourth embodiment of the probe head showing a temperature sensor.

FIG. 10 is a cross-sectional view of probe head 300 showing temperature sensor 320. Probe head 300 includes exterior surface 310, interior surface 312, passageway 314, ceramic body 316, heater 318, and temperature sensor 320. Ceramic body 316 includes ceramic layer 322, ceramic layer 324, and ceramic layer 326. Heater 318 includes heater layer 328. Temperature sensor 320 includes sensor layer 330.

Probe head 300 has the same structure and function as probe head 10 described with respect to FIGS. 1-7. Probe head 300 has an exterior surface 310 at an outer surface of probe head 300 and interior surface 312 at an inner surface of probe head 300. Interior surface 312 forms passageway 314 at a center of probe head 300. Exterior surface 310, interior surface 312, and passageway 314 are all formed by ceramic body 316.

In this embodiment, probe head 300 has heater 318 and temperature sensor 320 embedded within ceramic body 316. Ceramic body 316 and heater 318 have a similar structure and function as ceramic body 52 and heater 54, respectively, described with respect to FIG. 7; however, probe head 300 also includes temperature sensor 320, ceramic body 316 has ceramic layers 322, 324, and 326, and heater 218 has heater layer 328. Ceramic layer 322 forms interior surface 312 and defines passageway 314. Sensor layer 330 is between ceramic layer 322 and ceramic layer 324. Heater layer 328 is between ceramic layer 324 and ceramic layer 326. Ceramic layer 326 forms exterior surface 310. In alternate embodiments, probe head 300 may comprise a stack up of any number of alternating ceramic layers, heater layers, and sensor layers. Further, the stack up of ceramic layers 322, 324, and 326, heater layers 328, and sensor layers 330 may vary along probe head 300. In this embodiment, sensor layer 330 is interior to heater layer 328. In alternate embodiments, sensor layer 330 may be exterior to heater layer 328.

Ceramic layers 322, 324, and 326, heater layer 328, and sensor layer 330 undergo a high temperature co-fired ceramic process to form probe head 300. Ceramic layers 322, 324, and 326 of ceramic body 316 form the structure of probe head 300. Ceramic layers 322 and 324 provide insulation for sensor layer 330 of temperature sensor 320, and ceramic layers 324 and 326 provide insulation for heater layer 328 of heater 318. Variation of location within probe head 300 and thickness of heater layer 328 allow for tailored heat distribution along probe head 300. Temperature sensor 320 allows for temperature measurement at specific locations within probe head 300, allowing for health monitoring and prognostics, and simplifies installation.

Figure 11A:
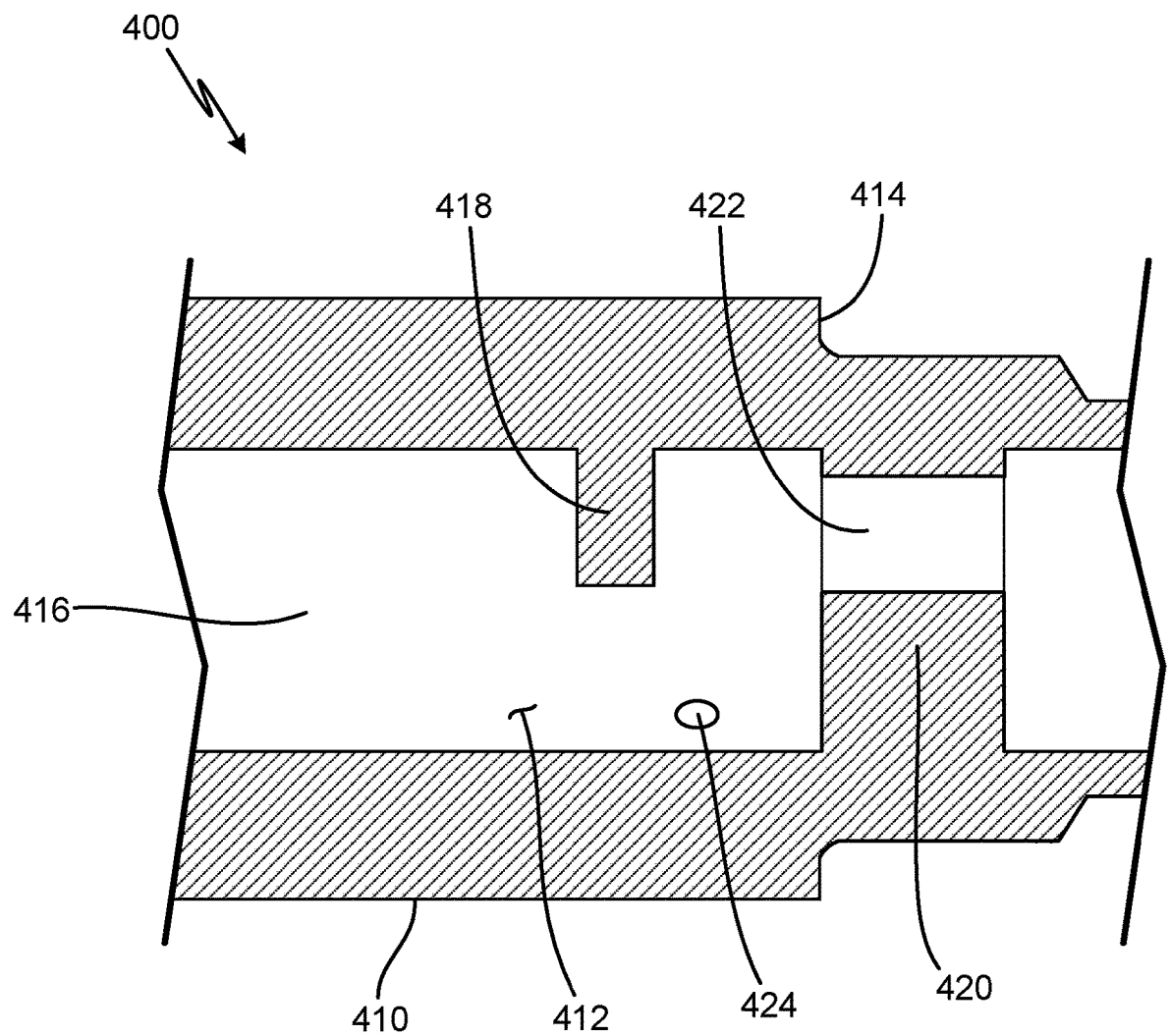
FIG. 11A is a partial cross-sectional view of a fifth embodiment of the probe head showing water dams.
Figure 11B:
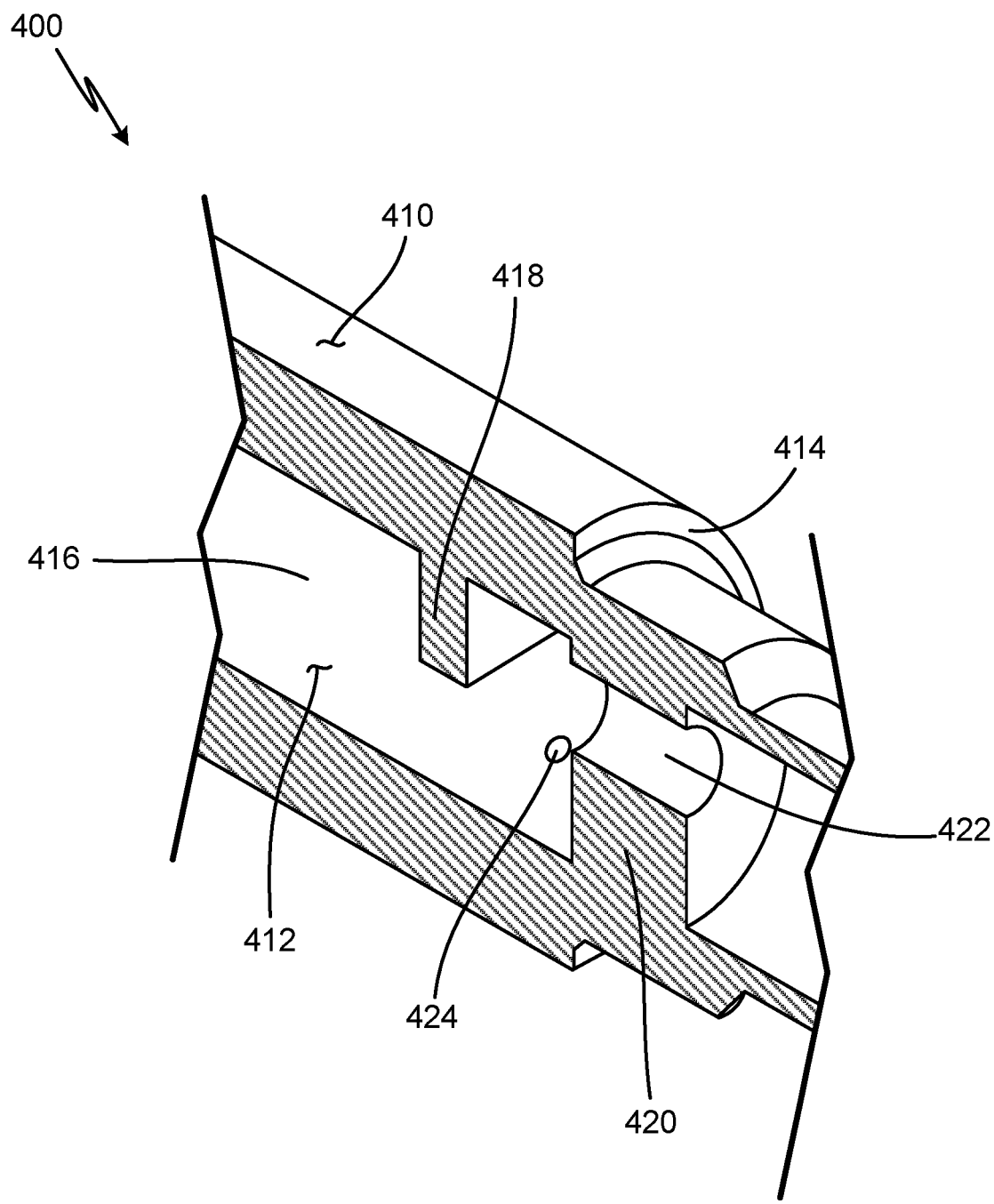
FIG. 11B is partial isometric cross-sectional view of the fifth embodiment of the probe head showing the water dams.

FIG. 11A is a partial cross-sectional view of probe head 400 showing water dams 418 and 420. FIG. 11B is partial isometric cross-sectional view of probe head 400 showing water dams 418 and 420. FIGS. 11A and 11B will be discussed together. Probe head 400 includes exterior surface 410, interior surface 412, shoulder 414, passageway 416, first water dam 418, second water dam 420 (including bore 422), and drain hole 424.

Probe head 400 has a similar structure and function as probe head 10 described with respect to FIGS. 1-7, including exterior surface 410, interior surface 412, shoulder 414, and passageway 416. However, probe head 400 does not include a lip, first post, or second post and does include first water dam 418 and second water dam 420 (which includes bore 422) with drain hole 424 being position therebetween. As such, passageway 416 has a constant cross-sectional area along probe head 400 beyond a tip of probe head 400.

First water dam 418 is semi-annular and has a first end connected to interior surface 412 and a second end within passageway 416. Second water dam 420 is annular and has a periphery connected to interior surface 412 along an entire circumference of second water dam 420. Second water dam 420 has bore 422, which is a passageway extending from an upstream end to a downstream end of second water dam 420. Bore 422 is in alignment with first water dam 418. Second water dam 420 is downstream of first water dam 418. First water dam 418 and second water dam 420 are made of the same material as the ceramic body (described with respect to FIGS. 1-10) of probe head 400, such as aluminum nitride. First water damn 418 and second water dam 420 may be connected to the ceramic body via brazing, gluing, or any other suitable method.

Drain hole 424 is a hole that extends from interior surface 412 to exterior surface 410 of probe head 400. Drain hole 424 is downstream of first water dam 418 and upstream of second water damn 420 such that drain hole 424 is between first water dam 418 and second water dam 420. In this embodiment, probe head 400 has one drain hole 424. In alternate embodiments, probe head 400 may have any number of drain holes 424. First water dam 418, second water dam 420, and drain hole 424 act as a water management feature of probe head 400.

As external airflow enters probe head 400 and flows through passageway 416, water and ice particles in the airflow hit and are knocked down by first water dam 418 and second water dam 420 as airflow changes direction in response to first water dam 418 and second water dam 420. Because probe head 400 is heated, first water dam 418 and second water dam 420 are heated, and knocked down ice particles melt within passageway 416. Second water dam 420 prevents the water from moving further downstream within probe head 400. Water then drains out of passageway 416 via drain hole 424 to exit probe head 400. Therefore, first water dam 418 and second water dam 420 prevent ingested airflow and contaminants within the airflow from having a straight path through probe head 400 and affecting the functionality of probe head 400.

Figure 12:
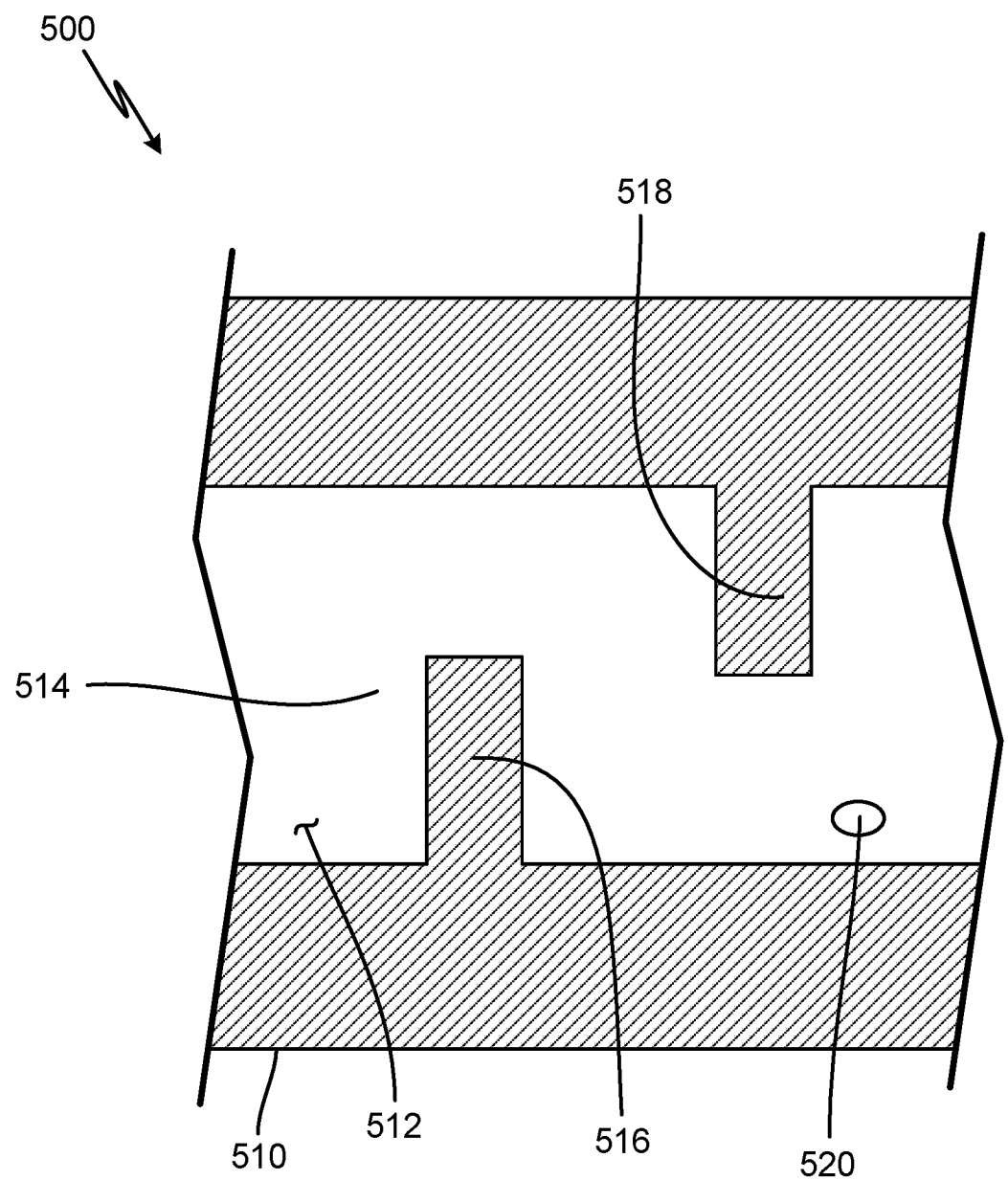
FIG. 12 is a partial cross-sectional view of a sixth embodiment of the probe head showing water dams.

FIG. 12 is a partial cross-sectional view of probe head 500 showing water dams 516 and 518. Probe head 500 includes exterior surface 510, interior surface 512, passageway 514, first water dam 516, second water dam 518, and drain hole 520.

Probe head 500 has a similar structure and function as probe head 10 described with respect to FIGS. 1-7, including exterior surface 510, interior surface 512, and passageway 514. However, probe head 500 does not include a lip, first post, or second post and does include first water dam 516 and second water dam 518. As such, passageway 514 has a constant cross-sectional area along probe head 500 beyond a tip of probe head 500.

First water dam 516 has a first end connected to interior surface 512 and a second end within passageway 514. Second water dam 518 has a first end connected to interior surface 512 opposite the first end of first water dam 516 and a second end within passageway 514. First water dam 516 and second water dam 518 radially overlap. Second water dam 518 is downstream of first water dam 516. First water dam 516 and second water dam 518 are made of the same material as the ceramic body (described with respect to FIGS. 1-10) of probe head 500, such as aluminum nitride.

First water damn 516 and second water dam 518 may be connected to the ceramic body via brazing, gluing, or any other suitable method.

Drain hole 520 is a hole that extends from interior surface 512 to exterior surface 510 of probe head 500. Drain hole 520 is downstream of first water dam 516 and second water damn 518. In this embodiment, probe head 500 has one drain hole 520. In alternate embodiments, probe head 500 may have any number of drain holes 520. First water dam 516, second water dam 518, and drain hole 520 act as a water management feature of probe head 500.

As external airflow enters probe head 500 and flows through passageway 514, water and ice particles in the airflow hit and are knocked down by first water dam 516 and second water dam 518 as airflow changes direction in response to first water dam 516 and second water dam 518. Because probe head 500 is heated, first water dam 516 and second water dam 518 are heated, and knocked down ice particles melt within passageway 514. Water then drains out of passageway 514 via drain hole 520 to exit probe head 500. Therefore, first water dam 516 and second water dam 518 prevent ingested airflow and contaminants within the airflow from having a straight path through probe head 500 and affecting the functionality of probe head 500.

Discussion of Possible Embodiments

The following are non-exclusive descriptions of possible embodiments of the present invention.

A probe head for an air data probe includes a ceramic body; and a heater embedded within the ceramic body.

The probe head of the preceding paragraph can optionally include, additionally and/or alternatively, any one or more of the following features, configurations and/or additional components:

The probe head is formed by a high temperature co-fired ceramic process.

The probe head has about zero porosity.

The ceramic body makes up an exterior surface of the probe head and an interior surface of the probe head.

The ceramic body is aluminum nitride.

The heater is tungsten composite.

The heater varies in thickness.

A temperature sensor embedded within the ceramic body.

A passageway formed by an interior surface of the probe head and extending an entire length of the probe head; a post having a first end connected to the interior surface of the probe head and a second end connected to the interior surface of the probe head such that the post extends through a center of the passageway; and a drain hole extending from the interior surface of the probe head to an exterior surface of the probe head.

The interior surface of the ceramic body forms a lip such that the passageway has a smaller cross-sectional area at the lip.

The heater comprises a first heater layer.

The ceramic body comprises a first ceramic layer and a second ceramic layer, the first heater layer being between the first ceramic layer and the second ceramic layer.

The heater further comprises a second heater layer between the second ceramic layer and a third ceramic layer of the ceramic body.

A via contacting the first heater layer and the second heater layer.

A temperature sensor having a sensor layer between the second ceramic layer and a third ceramic layer of the ceramic body.

An air data probe comprising: the probe head of the preceding paragraph; and a transition piece having a first end connected to the probe head and a second end configured to be connected to a strut such that the transition piece connects the probe head to the strut.

The probe head includes a shoulder, and the first end of the transition piece is connected to the probe head at the shoulder.

The shoulder has a metalized surface, and the transition piece is made of nickel.

The transition piece is a high stress area of the air data probe.

A passageway formed by an interior surface of the probe head and extending an entire length of the probe head; a first water dam having a first end connected to the interior surface of the probe head and a second end within the passageway; a second annular water dam having a periphery connected to the interior surface of the probe head along an entire circumference of the second water dam, the second water dam including a bore extending from an upstream end to a downstream end of the second water dam; and a drain hole extending from the interior surface of the probe head to an exterior surface of the probe head between the first water dam and the second water dam.

A passageway formed by an interior surface of the probe head and extending an entire length of the probe head; a first water dam having a first end connected to the interior surface of the probe head and a second end within the passageway; a second water dam having a first end connected to the interior surface of the probe head opposite the first end of the first water dam and a second end within the passageway; and a drain hole extending from the interior surface of the probe head to an exterior surface of the probe head downstream of first water dam.

An air data probe includes a strut; a probe head connected to the strut, the probe head comprising: a ceramic body; and a heater embedded within the ceramic body; and a transition piece having a first end connected to the probe head and a second end connected to the strut such that the transition piece connects the probe head to the strut.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
   a probe head comprising:
     a ceramic body; and
     a heater embedded within the ceramic body; and
   a transition piece having a first end connected to the probe head and a second end configured to be connected to a strut such that the transition piece connects the probe head to the strut;
   wherein the probe head includes a shoulder having a metalized surface, and the first end of the transition piece is connected to the probe head at the shoulder; and wherein the transition piece is made of a ductile material to absorb impacts and to prevent the ceramic body from fracturing and separating from the air data probe.

2. The probe head of claim 1, wherein the probe head is formed by a high temperature co-fired ceramic process.

3. The probe head of claim 1, wherein the probe head has about zero porosity.

4. The probe head of claim 1, wherein the ceramic body makes up an exterior surface of the probe head and an interior surface of the probe head.

5. The probe head of claim 1, wherein the ceramic body is aluminum nitride.

6. The probe head of claim 1, wherein the heater is tungsten composite.

7. The probe head of claim 1, wherein the heater varies in thickness.

8. The probe head of claim 1, further comprising a temperature sensor embedded within the ceramic body.

9. The probe head of claim 1, further comprising:
a passageway formed by an interior surface of the probe head and extending an entire length of the probe head;
a post having a first end connected to the interior surface of the probe head and a second end connected to the interior surface of the probe head such that the post extends through a center of the passageway; and
a drain hole extending from the interior surface of the probe head to an exterior surface of the probe head.

10. The probe head of claim 9, wherein the interior surface of the ceramic body forms a lip such that the passageway has a smaller cross-sectional area at the lip.

11. The probe head of claim 1, wherein the heater comprises a first heater layer.

12. The probe head of claim 11, wherein the ceramic body comprises a first ceramic layer and a second ceramic layer, the first heater layer being between the first ceramic layer and the second ceramic layer.

13. The probe head of claim 12, wherein the heater further comprises a second heater layer between the second ceramic layer and a third ceramic layer of the ceramic body.

14. The probe head of claim 13, further comprising a via contacting the first heater layer and the second heater layer.

15. The probe head of claim 12, further comprising a temperature sensor having a sensor layer between the second ceramic layer and a third ceramic layer of the ceramic body.

16. The air data probe of claim 1, wherein the transition piece is made of nickel.

17. The air data probe of claim 1, wherein the transition piece is a high stress area of the air data probe.

18. The probe head of claim 1, further comprising:
a passageway formed by an interior surface of the probe head and extending an entire length of the probe head;
a first water dam having a first end connected to the interior surface of the probe head and a second end within the passageway;
a second annular water dam having a periphery connected to the interior surface of the probe head along an entire circumference of the second water dam, the second water dam including a bore extending from an upstream end to a downstream end of the second water dam; and
a drain hole extending from the interior surface of the probe head to an exterior surface of the probe head between the first water dam and the second water dam.

19. The probe head of claim 1, further comprising:
a passageway formed by an interior surface of the probe head and extending an entire length of the probe head;
a first water dam having a first end connected to the interior surface of the probe head and a second end within the passageway;
a second water dam having a first end connected to the interior surface of the probe head opposite the first end of the first water dam and a second end within the passageway; and
a drain hole extending from the interior surface of the probe head to an exterior surface of the probe head downstream of first water dam.

20. An air data probe comprising:
a strut;
a probe head connected to the strut, the probe head comprising:
a ceramic body; and
a heater embedded within the ceramic body; and
a transition piece made of nickel and having a first end connected to the probe head and a second end connected to the strut such that the transition piece connects the probe head to the strut;
wherein the probe head includes a shoulder having a metalized surface, and the first end of the transition piece is connected to the probe head at the shoulder.

* * * * *